Patented Feb. 12, 1952

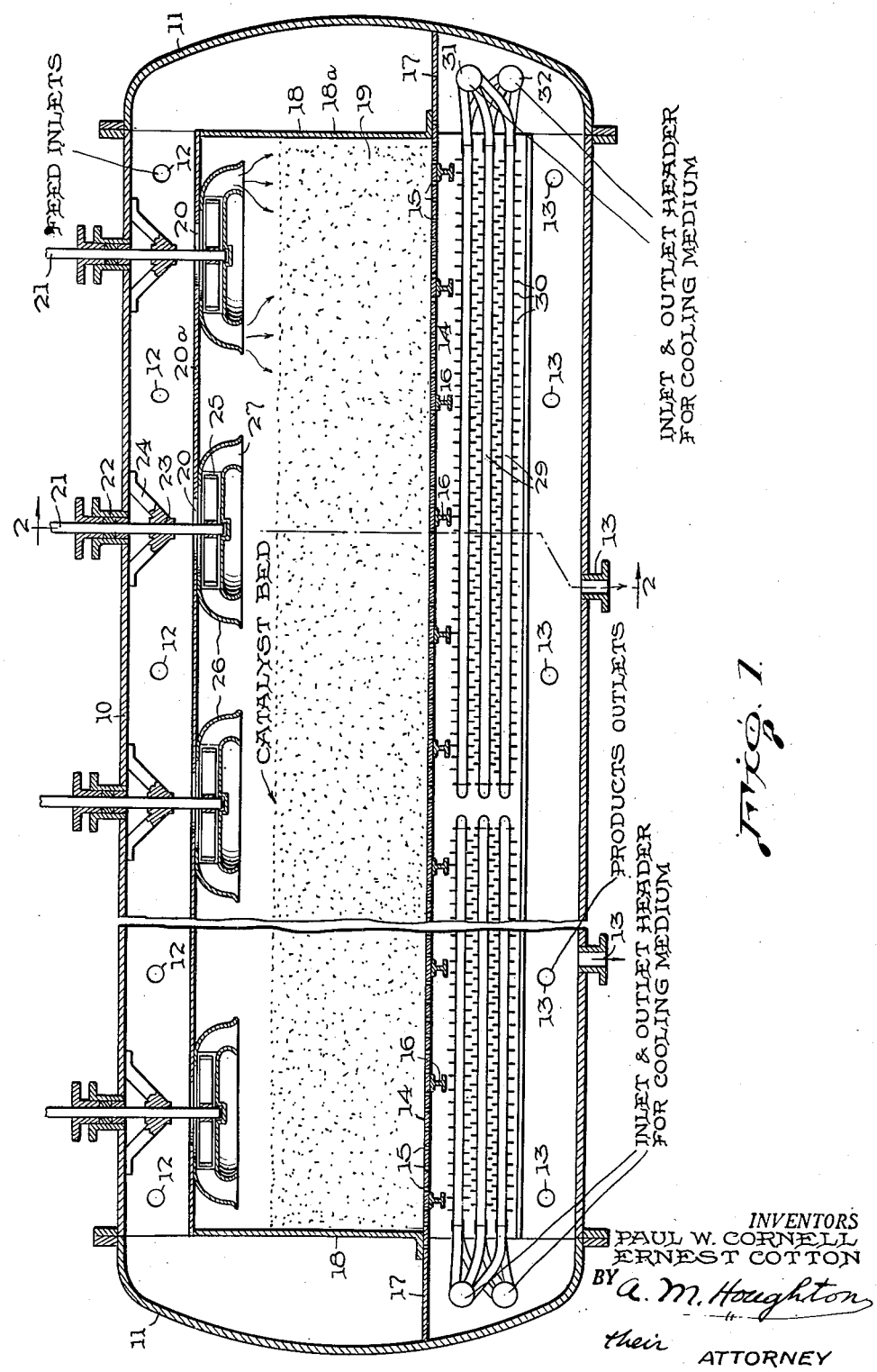

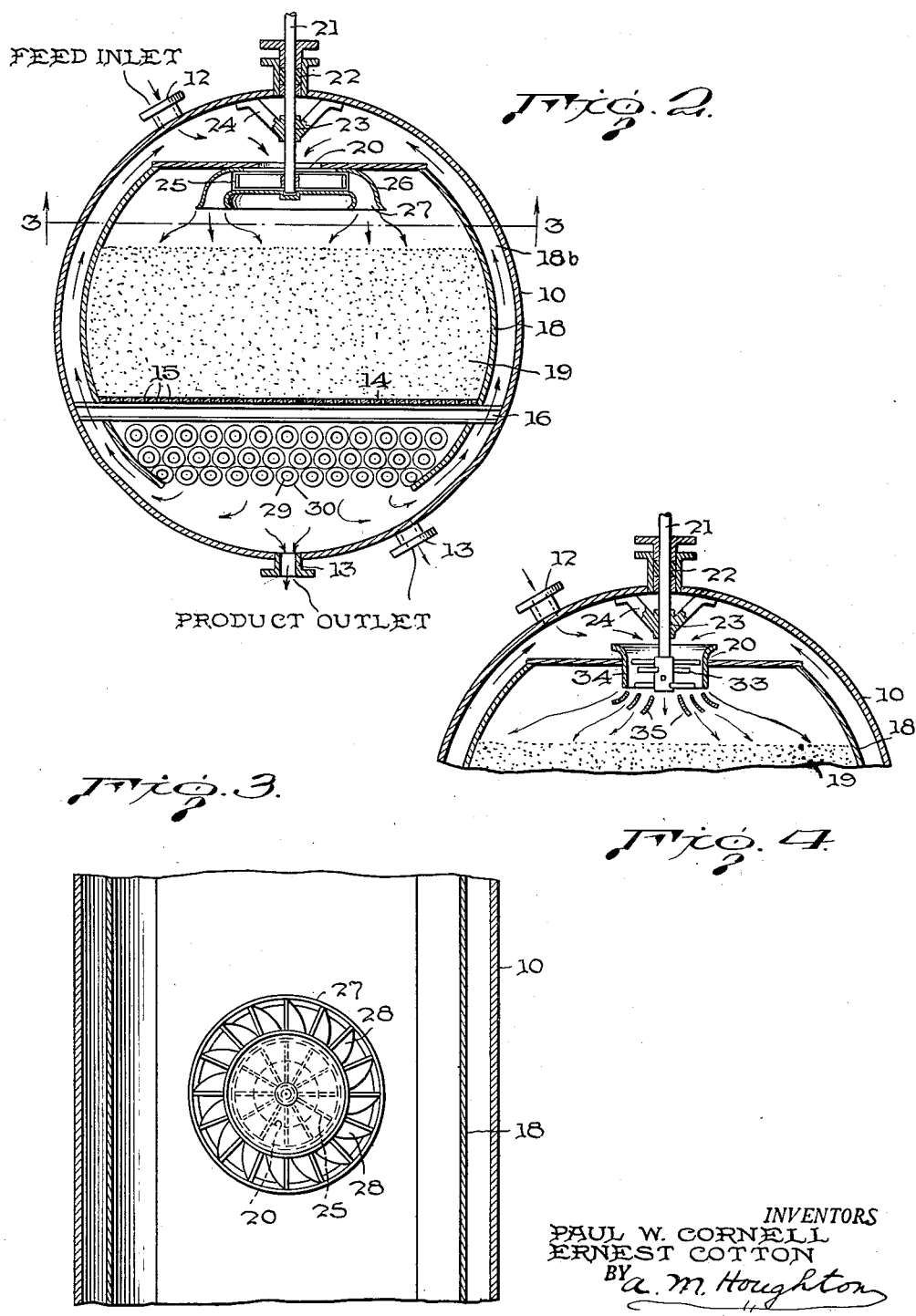

2,585,441

UNITED STATES PATENT OFFICE 2,585,441

CATALYTIC REACTOR

Paul W. Cornell and Ernest Cotton, Mount Lebanon, Pa., assignors to Gulf Oil Corporation, Pittsburgh, Pa., a corporation of Pennsylvania Application December 22, 1947, Serial No. 793,306

9 Claims. (Cl. 23—288)

This invention relates to a catalytic reactor, and more particular to an apparatus for carrying out catalytic chemical reactions.

In the conduct of catalytic chemical reactions, particularly on a large scale, serious problems have been encountered when the particular reaction involved either liberates or absorbs large amounts of heat. Notably in the former case, i. e., when large amounts of heat are liberated in exothermic reactions, the control of the reaction temperature has been difficult, since the solid catalytic bodies used are ordinarily poor conductors of heat. Various means have been employed in the art to remove or supply heat to a catalytic chemical reaction, such as the circulation of heat transfer liquids in the reaction zone; but where the reaction temperature must be maintained within relatively narrow limits, as in the synthesis of normally liquid hydrocarbons from hydrogen and carbon monoxide, such prior means have not been entirely satisfactory.

In the synthesis of normally liquid hydrocarbons from hydrogen and carbon monoxide, it has been suggested that the heat of reaction be removed and the temperature of the reaction thereby controlled by recirculating relatively large quantities of synthesis gases. However, this operating method as practiced in the past has entailed the large energy loss associated with the customary methods of recirculating large quantities of gases. Thus, a considerable portion of the work required in moving the gaseous materials through the system is expended in circulating the gases to and from the actual reaction zone rather than through it. Furthermore such a method requires long and extensive piping, external coolers, external compressors and the like, all of which increase the cost of circulating the gas.

One of the objects achieved by our invention is the carrying out of exothermic and endothermic chemical reactions in such manner as to minimize the work required to circulate large quantities of fluids for controlling the temperature of the reaction.

Another object achieved by our invention is the elimination of excessive pressure drop due to the effects of extensive external circulation in a system requiring the use of large amounts of circulating gases. Other objects will be apparent from the following description of our invention.

In accordance with our invention, we provide a reactor for conducting catalytic chemical reactions which comprises a horizontal shell closed at both ends thereof and provided with inlets at the top and outlets at the bottom, a catalyst bed support having perforations therein within the shell, a heat transfer means within the shell, and means for circulating fluid reactants through the catalyst bed and the heat transfer means back to the circulating means.

Our invention may be more readily understood by reference to the attached drawings wherein, Figure 1 shows an elevational view in cross section of an embodiment of a reactor in accordance with our invention;

Figure 2 is a sectional view along the line 2—2 of Figure 1 in the direction of the arrows;

Figure 3 is a sectional view along the line 3—3 of Figure 2 in the direction of the arrows; and Figure 4 is a sectional view showing another embodiment of the circulating means.

Referring now to the drawings, there is shown a cylindrical shell 10 which is preferably in a horizontal position. Both ends of the shell are provided with flanged closures 11. The shell and its closures thus comprise a reaction vessel which, if desired, may be constructed of a pressure-resistant material. At or near the top of the vessel, there are provided a plurality of feed inlets 12. At or near the bottom of the vessel, there are provided a plurality of outlets 13 for removing fluid products. Within the reaction vessel there is disposed, preferably in a horizontal position, a support 14 for a catalyst bed 19. The catalyst support 14 has openings or perforations 15, and may be a grid, grating, screen or perforated tray. The catalyst support is in turn mounted on suitable supporting members, such as the I-beams 16. Imperforate support 14, extend to the closures 11 the shell 10 and serve to seal off that portion of the reactor not in the path of the circulating fluids.

Disposed within the shell 10 and surrounding the catalyst bed 19 is a second shell represented generally at 18 and closed at the end thereof by closures 18a. The second shell forms a passageway or duct 18b with the shell 10. The catalyst bed 19 and support 14 are preferably coextensive in length with the second shell. The top 20a of the second shell has openings 20 therein. As shown more clearly in Figure 2, the second shell is open at the bottom, but preferably surrounds the heat transfer means hereinafter described.

Fluid circulating means or blowers are provided as follows. Extending through the shell 10 and the openings 20 are drive shafts 21 connected to any suitable prime mover (not shown). Where the shafts 21 extend through the shell 10, conventional stuffing boxes 22 are supplied.

The shafts are journaled in suitable bearings 23 mounted in supporting members 24. Mounted on the ends of the shafts 20 within the second shell 18 are impellers of the centrifugal type having blades 25. The impellers are surrounded by circular shrouds 26 attached to the top 20a of the second shell, communicating with the openings 20 in the top of the second shell, and having flared downwardly directed discharge openings 27. As shown in Figure 3, vanes 28 may be mounted in the shroud and, together with the shroud, serve to deflect the horizontal stream of fluids leaving the tips of the impeller blades 25 downwardly in a substantially vertical direction. From the flared opening 27 of the shroud, the fluids are uniformly distributed over a relatively wide area of the catalyst bed. The fluid circulating means or blower assembly thus provided produces a pressure head over the catalyst bed 19 equivalent to the pressure lost by the circulating fluids in their passage from the circulating means through the catalyst bed and back to the circulating means.

Within the shell 10, there is also provided a heat transfer means, suitably a tubular heat exchanger. The heat exchanger is composed of tubes 29 preferably provided with fins 30. The fins are preferably arranged in a transverse or spiral location around the tubes, thus permitting nesting of the tubes. This construction permits of securing the maximum amount of heat transfer surface within the desired space, and furthermore, permits of cooling the fluids passing over the heat exchanger with a minimum mechanical energy loss. The heat exchanger is provided with an inlet header 32 and an outlet header 31 for circulating a heat transfer medium, such as water or any other desirable heat transfer fluid, through the tubes of the heat exchanger. As shown in Figure 2, the heat exchanger is preferably located within the second shell 18.

Figure 4 shows a modification of the circulating means shown in Figures 1, 2 and 3. In Figure 4, the impeller is of an axial type and the blades 33 thereof normally discharge fluids in a vertical direction. A cylindrical shroud 34 in the opening 20 surrounds the impeller. Deflectors 35 are provided to distribute the fluids over a relatively wide area.

In operation, fluid reactants enter the reactor through the inlets 12, pass through the openings 20 in the top of the second shell 18 and are circulated by the circulating means over and through the catalyst bed 19 in a substantially vertical direction. The reaction products plus unreacted fluids pass through the perforations 15 in the catalyst support 14 and then over the finned tubes of the heat exchanger where they are cooled or heated, depending upon whether the reaction is exothermic or endothermic respectively. A minor portion of the total fluids passing over the heat exchanger is withdrawn through the product outlets 13 and passed to any suitable product recovery equipment, not shown. A major portion of the fluids passing over the heat exchanger pass upwardly in the passageway or duct 18b formed by the shells 10 and 18 and return to the openings 20, whence they are again circulated through the catalyst bed by the circulating means.

The reactor of our invention is particularly suitable for the synthesis of normally liquid hydrocarbons from carbon monoxide and hydrogen in the presence of a catalyst. This reaction is highly exothermic and unless the heat of reaction is efficiently removed and the reaction temperature maintained within a relatively narrow range, the reaction tends to get out of control. Suitable catalysts for the above reaction are iron, cobalt or nickel, which may be promoted with materials such as thoria, alumina, etc. or may be unpromoted, as desired. The catalysts may be supported or unsupported and may be in the form of pellets or granules. These catalysts are well known in the art and need no further description here. Temperatures of the reaction may vary over a relatively wide range, say from about 400° to 650° F., depending upon the particular catalyst employed. Although with some catalysts a relatively large temperature variation from the operating temperature may be tolerated, in most instances it is essential that the temperature variation not exceed from 10° to 20° F. The pressure may vary from atmospheric to about 500 pounds per square inch gauge. After leaving the catalyst bed, the gases are cooled somewhat, say from 10° to 100° F., and sufficient gas is recirculated together with fresh synthesis gas to absorb the heat of reaction and thus maintain the catalyst bed and the reaction within the desired temperature limits.

Although we have shown a plurality of circulating means within a single reactor shell, we do not wish to be limited thereto, since a single reactor may contain only one or two circulators. However, we prefer the use of a multiplicity of circulators since there is then secured an optimum distribution of reactant fluids through the catalyst bed, and the reactor may be operated satisfactorily in spite of the temporary mechanical failure of one or more of the circulators. While we have shown the heat exchanger below the catalyst bed, it may be located either above or to the side of the catalyst bed. The shells need not be cylindrical as shown, but may be of any suitable shape. It is preferred, however, that the outer shell 10, which, together with the closures or heads 11, are normally the only portions of the apparatus subjected to full operating pressure, be cylindrical in shape. The inner shell may be in the form of an elongated box with the sides thereof diverging upwardly. Although the prime mover for the circulating means has been described to be outside the shell 10, an internal prime mover such as a steam turbine may be employed, thereby eliminating the stuffing boxes for the shafts.

Our reactor is adapted for use in any chemical reaction employing a solid catalyst and involving the removal or supply of large amounts of heat from or to the reaction zone. The reactants need not be gaseous but may also be liquids. Thus in addition to the synthesis of normally liquid hydrocarbons from carbon monoxide and hydrogen, our reactor may be used for regeneration by oxidation of cracking catalysts contaminated by carbon, or for such liquid phase operations as isomerization of hydrocarbons.

The use of our reactor materially reduces the equipment necessary for a process wherein large amounts of fluid reactants are recirculated for temperature control, and minimizes the amount of energy required for circulating the fluids. In our reactor, substantially the only mechanical work required is that necessary for passing the reactant fluids through the catalyst bed. Only the outer shell 10 and the end closures 11 need be constructed of pressure resisting materials, and the other parts of the apparatus need be designed only to support their own weight and that of the catalyst.

What we claim is:

1. Apparatus for conducting catalytic chemical reactions comprising a horizontal elongated cylindrical shell closed at both ends thereof, inlet means at the top of said shell, outlet means at the bottom of said shell, a second shell closed at both ends thereof and having an opening in the top and an opening in the bottom thereof, said second shell being disposed centrally within said first-named shell and spaced from the walls thereof, foraminous support means adapted to support a fixed catalyst bed horizontally disposed within said second shell, impeller type circulating means disposed within said first-named shell in proximate position with respect to and in communication with the opening in the top of said second shell for circulating large quantities of fluids downwardly through said fixed catalyst bed and upwardly wholly within the space between the shells, and a heat exchanger disposed in the path of flow of said fluids and spaced vertically from said foraminous catalyst support means.

2. Apparatus for conducting catalytic chemical reactions comprising a horizontal elongated cylindrical shell closed at both ends thereof, inlet means at the top of said shell, outlet means at the bottom of said shell, a second shell closed at both ends thereof and having an opening in the top and an opening in the bottom thereof, said second shell being disposed centrally within said first-named shell and spaced from the walls thereof, a preforated tray adapted to support a fixed catalyst bed horizontally disposed within said second shell, a tubular heat exchanger disposed below said perforated tray within said second shell, and impeller-type circulating means within said first-named shell, said circulating means being disposed in proximate position with respect to and in communication with the opening in the top of said second shell for circulating wholly within said first-named shell large quantities of fluids downwardly through said fixed catalyst bed, over the tubes of said heat exchanger and upwardly through the space between the shells.

3. Apparatus in accordance with claim 2 wherein said second shell has a plurality of openings in the top thereof, and wherein said apparatus comprises a plurality of impeller-type circulating means within said first-named shell, said plurality of circulating means being equal in number to said plurality of openings in the top of said second shell, and each of said circulating means being disposed in proximate position with respect to and in communication with a separate one of said openings.

4. Apparatus in accordance with claim 2 wherein the impeller type circulating means comprises an impeller having blades adapted to discharge fluids in a horizontal direction, said blades being surrounded by a shroud having a flared opening discharging in a vertical direction over a relatively wide area, and vanes mounted in said shroud, said vanes together with said shroud serving to change the direction of the fluid flow from essentially horizontal to essentially vertical.

5. Apparatus in accordance with claim 2 wherein the impeller type circulating means comprises an impeller having blades adapted to discharge fluids in a vertical direction, a cylindrical shroud surrounding said blades, and deflectors below said blades for distributing the fluids over a relatively wide area.

6. Apparatus for conducting catalytic chemical reactions comprising a horizontal elongated cylindrical shell closed at both ends thereof; inlet means at the top of said shell; outlet means at the bottom of said shell; a second shell closed at both ends thereof and having an opening in the bottom thereof and a plurality of openings in the top thereof, said second shell being disposed centrally within said first-named shell and spaced from the walls thereof; foraminous support means horizontally disposed within said second shell adapted to support a fixed catalyst bed horizontally disposed within said second shell; a plurality of impellers, each disposed within said first-named shell in proximate position with respect to and in communication with one of said openings in the top of said second shell; each of said impellers having blades adapted to discharge fluids downwardly in a vertical direction, a cylindrical shroud positioned in each of said openings in the top of said second shell and surrounding said blades, and deflectors below said blades for distributing fluids discharged by said blades over a relatively wide area; said plurality of impellers being adapted to circulate large quantities of fluids downwardly through said fixed catalyst bed and upwardly wholly within the space between the shells; and a tubular heat exchanger having finned tubes disposed in the path of flow of said fluids and spaced vertically from said foraminous catalyst support means.

7. Apparatus for conducting catalytic chemical reactions comprising: a horizontal elongated cylindrical shell closed at both ends thereof; inlet means at the top of said shell; outlet means at the bottom of said shell; a second shell closed at both ends thereof and having an opening in the top and an opening in the bottom thereof, said second shell being disposed centrally within the first-named shell and spaced from the walls of said first shell to form a duct therewith; a perforated tray horizontally disposed within said second shell and adapted to support a fixed catalyst bed; a heat exchanger having finned tubes disposed below said perforated tray within said second shell and adjacent the opening in the bottom thereof; a shaft extending through the top of the first shell and the opening in the top of the second shell; a centrifugal impeller within said first-named shell and mounted on said shaft, said impeller being disposed in proximate position with respect to the opening in the top of said second shell and adapted to circulate large quantities of fluid reactants wholly within said first-named shell; a shroud surrounding said impeller, said shroud communicating with the opening in the top of said second shell and having a flared opening discharging in a vertical direction; and vanes mounted in said shroud, said vanes together with said shroud serving to change the direction of the fluid flow from essentially horizontal to essentially vertical.

8. Apparatus for conducting catalytic chemical reactions comprising: a horizontal elongated cylindrical shell closed at both ends thereof; inlet means at the top of said shell; outlet means at the bottom of said shell; a second shell closed at both ends thereof and having an opening in the bottom thereof and a plurality of openings in the top thereof, said shell being disposed centrally within the first-named shell and forming an annular space with the first-named shell; a perforated tray horizontally disposed within said second shell and adapted to support a fixed catalyst bed coextensive in length with said second shell; a heat exchanger having finned tubes disposed below said perforated tray within said second shell and adjacent the opening in the bottom thereof; a plurality of shafts each extending through the top of the first shell and one of said openings in the top of the second shell; a plurality of centrifugal impellers within said first-named shell, each impeller being mounted on one of said shafts, and disposed in proximate position with respect to the respective opening in the top of said shell, said impellers being adapted to circulate large quantities of fluid reactants wholly within said first-named shell; a shroud surrounding each impeller, said shroud communicating with the respective opening in the top of said second shell and having a flared opening discharging in a vertical direction; and vanes mounted in each shroud, said vanes together with the said shroud serving to change the direction of the fluid flow from essentially horizontal to essentially vertical.

9. Apparatus for conducting catalytic chemical reactions comprising a horizontal elongated cylindrical shell closed at both ends thereof, inlet means at the top of said shell, outlet means at the bottom of said shell, a second shell closed at both ends thereof and having an opening in the bottom thereof and a plurality of openings in the top thereof, said second shell being disposed centrally within said first-named shell and spaced from the walls thereof, foraminous support means horizontally disposed within said second shell adapted to support a fixed catalyst bed horizontally disposed within said second shell, centrifugal impellers within said first-named shell, a shroud surrounding each impeller, each said shroud communicating with one of said openings in the top of said second shell and having a flared opening discharging downwardly in a vertical direction, and vanes mounted in each shroud, said vanes together with said shroud serving to change the direction of the fluid flow from essentially horizontal to essentially vertical, each impeller being disposed in proximate position with respect to and in communication with one of said openings in the top of said second shell for circulating large quantities of fluids downwardly through said fixed catalyst bed and upwardly wholly within the space between the shells, and a tubular heat exchanger having finned tubes disposed in the path of flow of said fluids and spaced vertically from said foraminous catalyst support means.

PAUL W. CORNELL.
ERNEST COTTON.

REFERENCES CITED

The following references are of record in the file of this patent:

UNITED STATES PATENTS

| Number | Name | Date |
| --- | --- | --- |
| Re. 12,759 | Eschellmann | Mar. 10, 1908 |
| 843,524 | Doherty | Feb. 5, 1907 |
| 2,301,044 | Heard | Nov. 3, 1942 |
| 2,303,717 | Arveson | Dec. 1, 1942 |